(12) United States Patent
Kimpara

(10) Patent No.: US 12,358,602 B2
(45) Date of Patent: Jul. 15, 2025

(54) HYBRID SHIP PROPULSION MACHINE

(71) Applicant: SUZUKI MOTOR CORPORATION, Hamamatsu (JP)

(72) Inventor: Masatoshi Kimpara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 466 days.

(21) Appl. No.: 17/943,831

(22) Filed: Sep. 13, 2022

(65) Prior Publication Data
US 2023/0087634 A1 Mar. 23, 2023

(30) Foreign Application Priority Data
Sep. 17, 2021 (JP) .................................. 2021-152543

(51) Int. Cl.
| | |
|---|---|
| *B63H 21/20* | (2006.01) |
| *B63H 20/00* | (2006.01) |
| *B63H 20/10* | (2006.01) |

(52) U.S. Cl.
CPC ........... *B63H 21/20* (2013.01); *B63H 20/007* (2013.01); *B63H 20/106* (2013.01); *B63H 2020/003* (2013.01); *B63H 2021/205* (2013.01)

(58) Field of Classification Search
CPC .... B63H 21/20; B63H 20/007; B63H 20/106; B63H 2020/003; B63H 2021/205; B63H 20/06; B63H 20/12
See application file for complete search history.

(56) References Cited

U.S. PATENT DOCUMENTS

| | | | | |
|---|---|---|---|---|
| 3,567,164 | A * | 3/1971 | Hakala | B63H 20/106 248/641 |
| 3,881,443 | A * | 5/1975 | Hamp | B63H 20/007 440/6 |
| 4,890,811 | A | 1/1990 | Ehni | 248/642 |
| 5,002,509 | A * | 3/1991 | Uroszek | B63H 20/007 440/49 |
| 10,053,200 | B1 * | 8/2018 | Koetsier | B63H 20/106 |

(Continued)

FOREIGN PATENT DOCUMENTS

| | | |
|---|---|---|
| JP | 2007-8329 A | 1/2007 |
| JP | 2019-199148 A | 11/2019 |

(Continued)

OTHER PUBLICATIONS

Notice of Reasons for Refusal dated May 7, 2025, issued by the Japanese Patent Office Action issued in Japanese Patent Application No. 2021-152543.

*Primary Examiner* — Andrew Polay
(74) *Attorney, Agent, or Firm* — Stein IP, LLC

(57) ABSTRACT

A hybrid ship propulsion machine includes an internal-combustion-drive propulsion part, a fixing bracket configured to fix the internal-combustion-drive propulsion part to a ship, an electric propulsion part, an elevating device configured to elevate and lower the electric propulsion part; and an attachment bracket attaching the electric propulsion part and the elevating device to the fixing bracket. The elevating device is configured to elevate and lower the electric propulsion part between a position where a second propeller of the electric propulsion part sinks below a water surface and a position where the second propeller comes out of the water surface.

8 Claims, 10 Drawing Sheets

(56) References Cited

U.S. PATENT DOCUMENTS

| | | | |
|---|---|---|---|
| 2018/0257750 A1 | 9/2018 | Suzuki et al. | ......... B63H 5/125 |
| 2020/0031449 A1 | 1/2020 | Griffin et al. | .......... B63H 25/42 |
| 2021/0139123 A1 | 5/2021 | Osara et al. | ........... B63H 20/14 |
| 2022/0258843 A1 | 8/2022 | Osara et al. | ........... B63H 20/14 |

FOREIGN PATENT DOCUMENTS

| | | |
|---|---|---|
| JP | 2020-111332 A | 7/2020 |
| WO | WO 2017/082248 A1 | 5/2017 |

\* cited by examiner

HYBRID SHIP PROPULSION MACHINE

CROSS-REFERENCE TO RELATED APPLICATIONS

The disclosure of Japanese Patent Application No. 2021-152543 filed on Sep. 17, 2021, including specification, drawings and claims is incorporated herein by reference in its entirety.

BACKGROUND

The present invention relates to a hybrid ship propulsion machine including an internal-combustion-drive propulsion part using an internal combustion engine as a power source and an electric propulsion part using an electric motor as a power source.

In the related art, a ship propulsion machine using an internal combustion engine as a power source have been generally used, but in recent years, a ship propulsion machine using an electric motor as a power source have also been widely used.

When the internal combustion engine and the electric motor are compared with each other, it can be said that the internal combustion engine is superior to the electric motor in terms of the capability to make the ship sail at a high speed over a long period of time. Considering that a large-capacity battery is required to rotate the electric motor at a high speed over a long period of time, the internal combustion engine is currently more practical. On the other hand, it can be said that the electric motor capable of generating a high torque from a low rotation speed range is superior to the internal combustion engine in terms of the capability of moving the ship at an extremely low speed. In addition, it can be said that the electric motor is superior to the internal combustion engine in terms of the quietness during low-speed sailing. In the internal combustion engine, a large driving sound during low-speed sailing may become harsh.

In addition, there is a method of using both an internal combustion engine and an electric motor as a power source of a ship propulsion machine. According to this method, the shortage of the capability of the internal combustion engine in a low speed range can be compensated by the electric motor while utilizing the high capability of the internal combustion engine in a high speed range. In addition, according to this method, it is possible to prevent noise during low-speed sailing.

As the method of using both the internal combustion engine and the electric motor as the power source of the ship propulsion machine, there are the following two methods.

The first method is a method in which an internal-combustion-driven ship propulsion machine using only an internal combustion engine as a power source and an electric ship propulsion machine using only an electric motor as a power source are separately prepared, and these two types of ship propulsion machines are provided in a ship. For example, this corresponds to a case where an internal-combustion-driven outboard motor and an electric outboard motor are multi-mounted on one ship. The second method is a method in which a hybrid ship propulsion machine including both an internal combustion engine and an electric motor as power sources is provided in a ship.

Patent Literature 1 below describes an outboard motor including both an internal combustion engine and an electric motor as power sources. The outboard motor has an internal combustion engine and an electric motor built-in, and has a structure in which power of the internal combustion engine and power of the electric motor are transmitted to a common propeller via a common main drive shaft and a common propeller shaft. FIG. 2 of Patent Literature 1 shows a mechanism for transmitting the power of the internal combustion engine and the power of the electric motor to the main drive shaft, and this mechanism is provided with an automatic centrifugal clutch and a large number of gears.

Patent Literature 1: JP-A-2007-8329

SUMMARY

The present invention provides a hybrid ship propulsion machine including, an internal-combustion-drive propulsion part configured to generate a propulsive force of a ship by an internal combustion engine a fixing bracket configured to fix the internal-combustion-drive propulsion part to the ship an electric propulsion part configured to generate a propulsive force of the ship by an electric motor an elevating device configured to elevate and lower the electric propulsion part, and an attachment bracket attaching the electric propulsion part and the elevating device to the fixing bracket. The internal-combustion-drive propulsion part includes the internal combustion engine, a first propeller shaft configured to be rotated by power output from the internal combustion engine, a power transmission mechanism configured to transmit the power output from the internal combustion engine to the first propeller shaft, a first housing part housing the internal combustion engine, the first propeller shaft, and the power transmission mechanism, and a first propeller attached to the first propeller shaft. The electric propulsion part includes the electric motor, a second propeller shaft configured to be rotated by power output from the electric motor, a second housing part housing the electric motor and the second propeller shaft, and a second propeller attached to the second propeller shaft. The elevating device is configured to elevate and lower the electric propulsion part between a position where the second propeller sinks below a water surface and a position where the second propeller comes out of the water surface.

DESCRIPTION OF EMBODIMENTS

Figure 1:
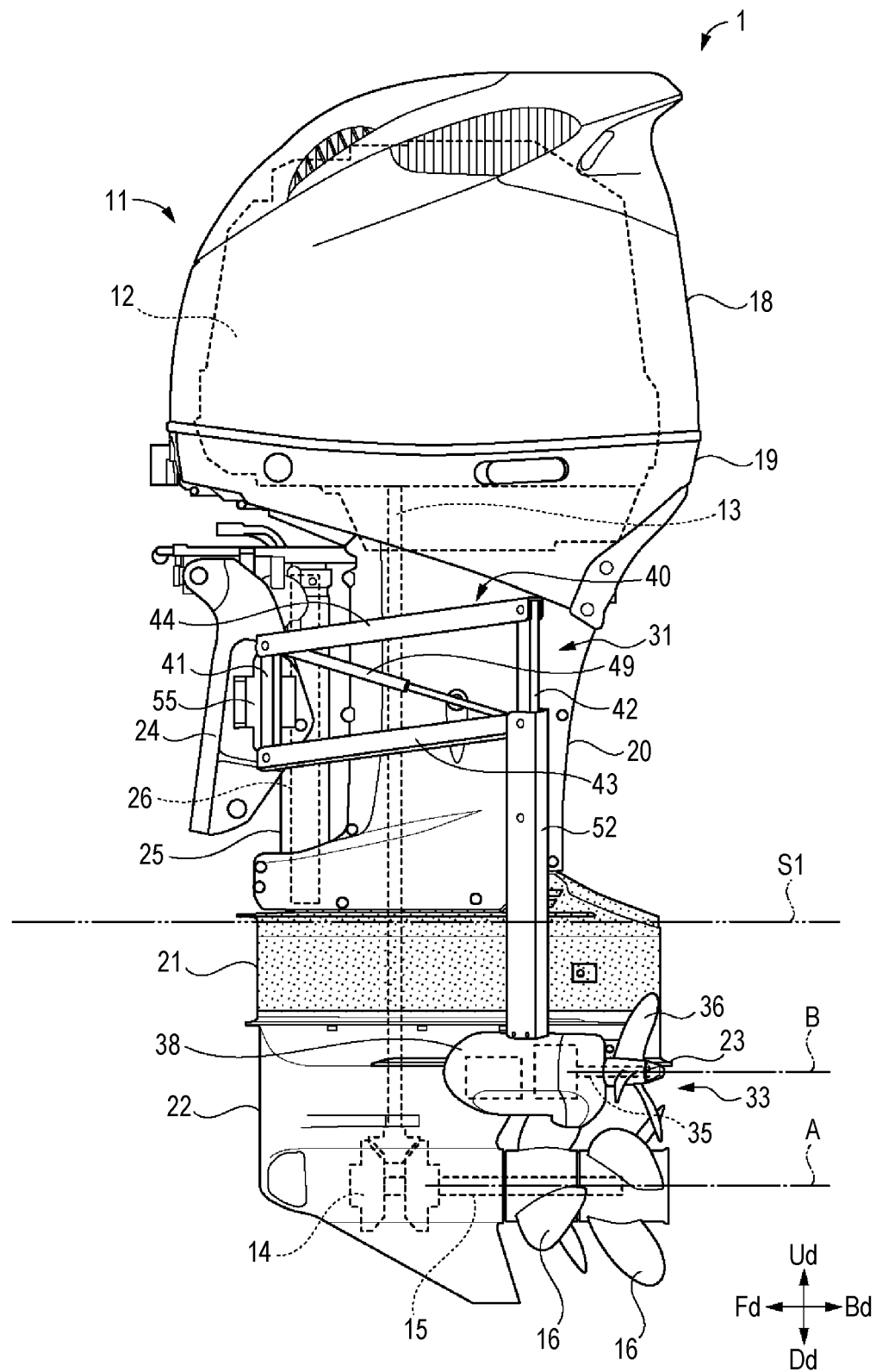
FIG. 1 is an explanatory view of a hybrid outboard motor according to an embodiment of the present invention in a state in which an electric propulsion part sinks below a water surface, as viewed from the left side thereof.

According to the method using both the internal combustion engine and the electric motor as the power source of the ship propulsion machine, as described above, it is possible to compensate for the disadvantage of the internal combustion engine by the electric motor while utilizing the advantage of the internal combustion engine, and it is possible to improve the sailing performance of the ship in a wide range of speed ranges.

However, there are the following problems in the method of providing the internal-combustion-driven ship propulsion machine using only the internal combustion engine as the power source and the electric ship propulsion machine using only the electric motor as the power source in a ship.

In order to provide the internal-combustion-driven ship propulsion machine and the electric ship propulsion machine, a certain large space is required. Therefore, it is difficult to provide the internal-combustion-driven ship propulsion machine and the electric ship propulsion machine in a small ship in which the space of the stem portion is small. In addition, in a medium-sized ship, for example, when a plurality of internal-combustion-driven outboard motors have already been multi-mounted on the ship, it may be difficult to further mount an electric outboard motor on the ship.

In addition, in the method of providing the hybrid ship propulsion machine, a mechanism for transmitting the power of the internal combustion engine and the power of the electric motor to a common drive shaft is complicated as in the outboard motor described in Patent Literature 1, and there is a problem that the manufacturing cost is increased.

Therefore, the inventor of the present application has conceived a method of externally attaching an electric propulsion device, which includes an electric motor and a propeller connected to an output shaft of the electric motor, to an internal-combustion-driven ship propulsion machine using only an internal combustion engine as a power source. According to this method, since the internal-combustion-driven ship propulsion machine to which the electric propulsion device is externally attached is provided in the ship, the ship propulsion machine directly provided in the ship is only the internal-combustion-driven ship propulsion machine. Therefore, even in a small ship in which the space of the stem portion is small and also in a ship in which a plurality of internal-combustion-driven outboard motors have already been multi-mounted, an internal-combustion-driven ship propulsion machine to which an electric propulsion device is externally attached can be easily provided, and a propulsive force by internal combustion driving and a propulsive force by electric driving can be obtained. In addition, according to this method, since the electric propulsion device is externally attached to the internal-combustion-driven ship propulsion machine, the propeller rotated by the power of the internal combustion engine and the propeller rotated by the power of the electric motor are separate from each other, and the mechanism for transmitting the power from the internal combustion engine to the propeller and the mechanism for transmitting the power from the electric motor to the propeller are separate from each other. Therefore, in order to obtain the propulsive force by the internal combustion engine and the propulsive force by the electric motor, it is not necessary to provide a complicated mechanism for transmitting the power of the internal combustion engine and the power of the electric motor to the common drive shaft in the ship propulsion machine.

However, the method of externally attaching the electric propulsion device to the internal-combustion-driven ship propulsion machine has the following problems. The electric propulsion device externally attached to the internal-combustion-driven ship propulsion machine sinks below a water surface. Therefore, during movement of the ship, water hits the electric propulsion device, which serves as resistance to the movement of the ship. The resistance increases during planing of the ship, and there is a concern that the sailing performance of the ship during planing may be reduced.

The present invention has been made in view of, for example, the above-described problems, and an object of the present invention is to provide a hybrid ship propulsion machine capable of preventing complication of an internal structure and preventing a decrease in a sailing performance of a ship during planing.

According to the present invention, it is possible to prevent an internal structure of a hybrid ship propulsion machine from being complicated, and it is possible to prevent a decrease in a sailing performance of a ship during planing.

A hybrid ship propulsion machine according to an embodiment of the present invention includes: an internal-combustion-drive propulsion part configured to generate a propulsive force of a ship by an internal combustion engine; a fixing bracket that fixes the internal-combustion-drive propulsion part to the ship; an electric propulsion part configured to generate a propulsive force of the ship by an electric motor; an elevating device configured to elevate and lower the electric propulsion part; and an attachment bracket that attaches the electric propulsion part and the elevating device to the fixing bracket.

The internal-combustion-drive propulsion part includes: the internal combustion engine; a first propeller shaft that is rotated by power output from the internal combustion engine; a power transmission mechanism configured to transmit the power output from the internal combustion engine to the first propeller shaft; a first housing part that houses the internal combustion engine, the first propeller shaft, and the power transmission mechanism; and a first propeller that is attached to the first propeller shaft.

The electric propulsion part includes: the electric motor; a second propeller shaft that is rotated by power output from the electric motor; a second housing part that houses the electric motor and the second propeller shaft; and a second propeller that is attached to the second propeller shaft.

The elevating device is configured to elevate and lower the electric propulsion part between a position where the second propeller sinks below a water surface and a position where the second propeller comes out of the water surface.

According to the hybrid ship propulsion machine of the present embodiment, during planing of the ship, the electric propulsion part is elevated by the elevating device such that the second propeller comes out of the water surface, and therefore, the resistance generated by the water hitting the electric propulsion part during the planing of the ship can be reduced, and the sailing performance of the ship during the planing can be prevented from being lowered by the resistance.

In addition, the hybrid ship propulsion machine of the present embodiment has a configuration in which the electric propulsion part and the elevating device are attached to the fixing bracket, which fixes the internal-combustion-drive propulsion part to the ship, via the attachment bracket. As understood from this configuration, the internal-combustion-drive propulsion part and the electric propulsion part are separate from each other, and are independent from each other. Specifically, the first propeller and the second propeller are separate from each other, and are independent from each other. In addition, a mechanism for transmitting the power of the internal combustion engine to the first propeller and a mechanism for transmitting the power of the electric motor to the second propeller are separate from each other, and are independent from each other. Therefore, it is possible to generate the propulsive force by the internal combustion engine and the propulsive force by the electric motor without using a complicated mechanism that transmits the power of the internal combustion engine and the power of the electric motor to a common drive shaft. Therefore, it is possible to prevent the internal structure of the hybrid ship propulsion machine from being complicated.

EMBODIMENT

Hereinafter, a hybrid outboard motor according to an embodiment of a hybrid ship propulsion machine of the present invention will be described with reference to the drawings. In the embodiment, when front (Fd), rear (Bd), left (Ld), right (Rd), upper (Ud), and lower (Dd) directions follow arrows drawn at the lower right portion in FIGS. 1 to 7 and 9A to 9D.

(Hybrid Outboard Motor)

Figure 2:
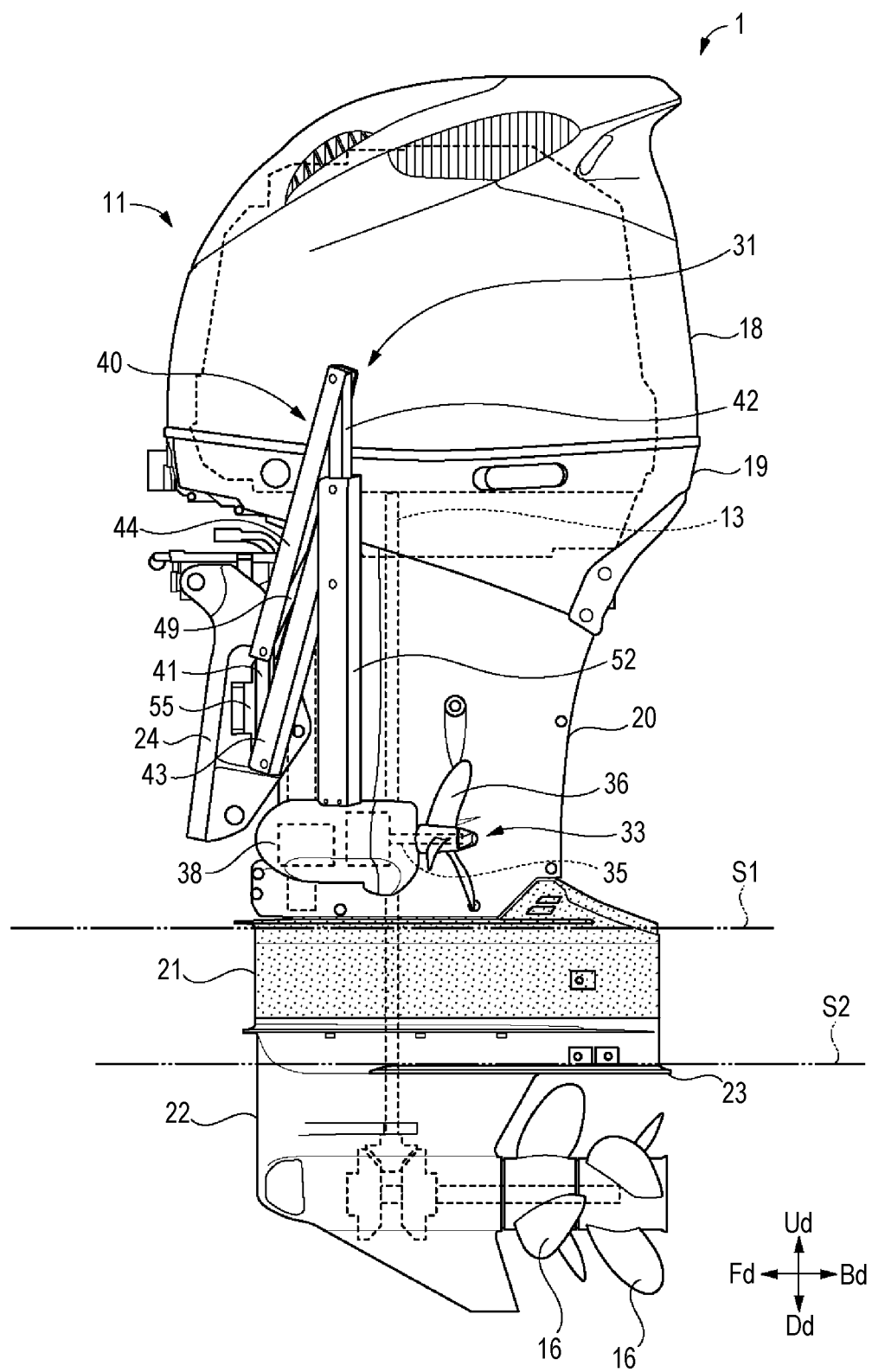
FIG. 2 is an explanatory view of the hybrid outboard motor according to the embodiment of the present invention in a state in which the electric propulsion part comes out of the water surface, as viewed from the left side thereof.
Figure 3:
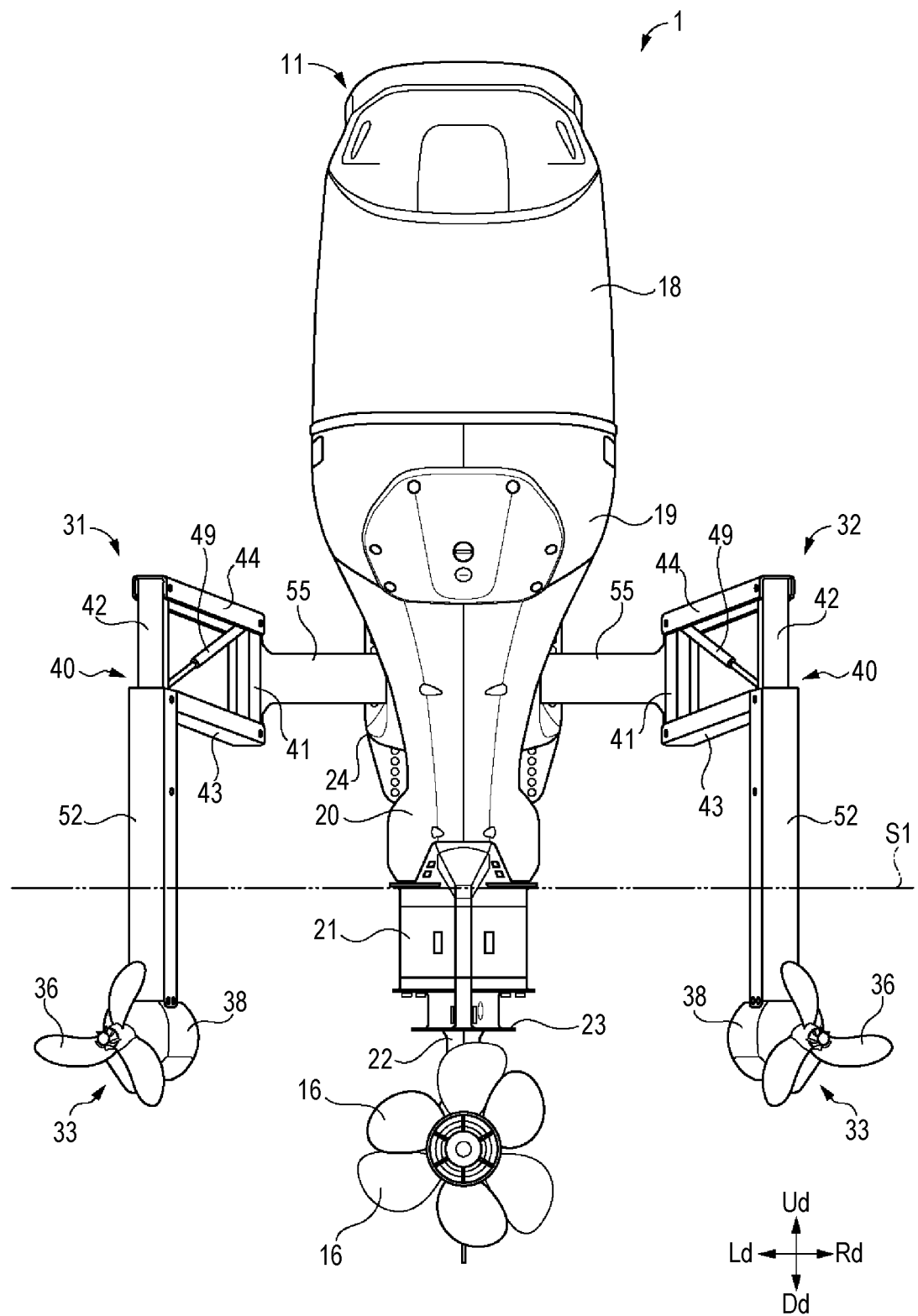
FIG. 3 is an explanatory view showing the hybrid outboard motor in FIG. 1 as viewed from the rear side thereof.
Figure 4:
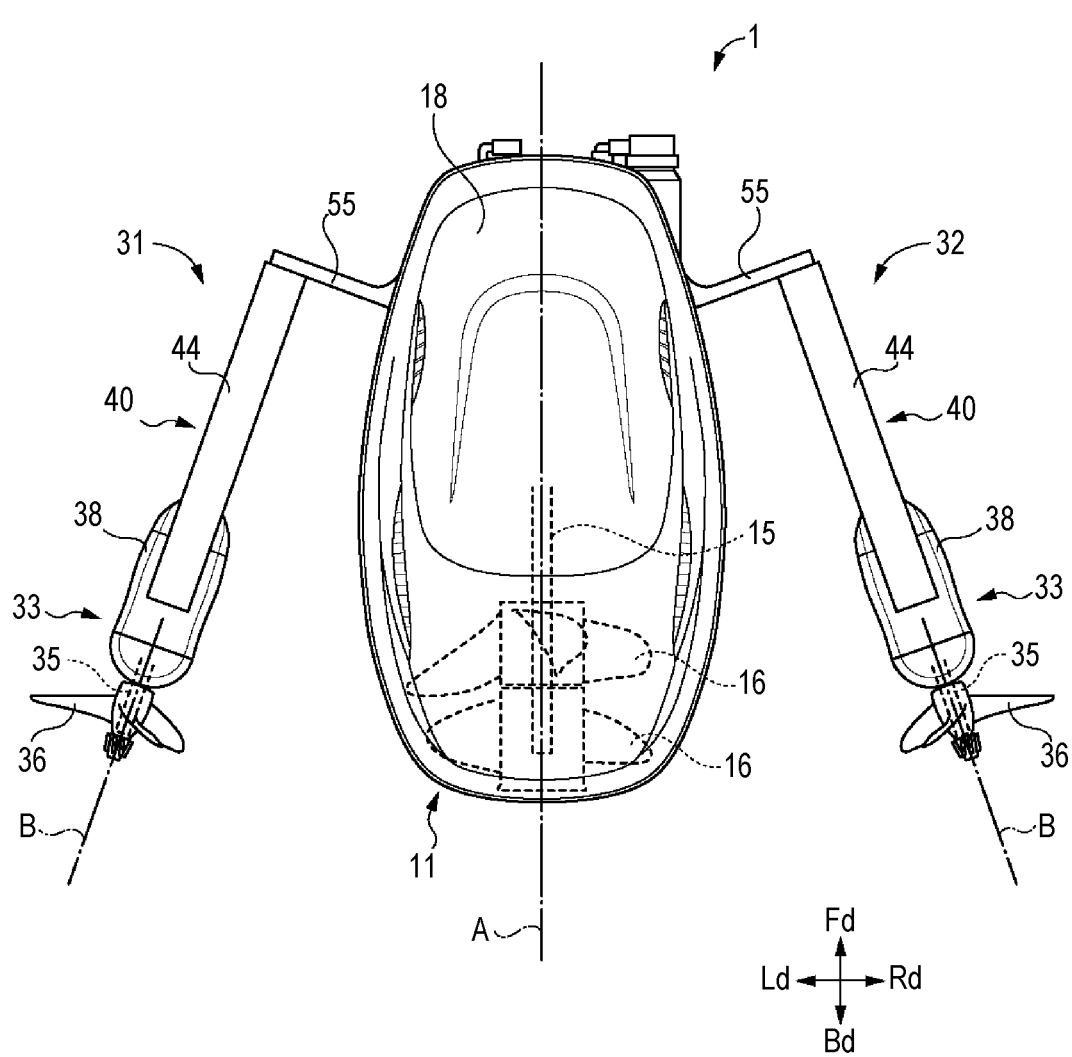
FIG. 4 is an explanatory view showing the hybrid outboard motor in FIG. 1 as viewed from above.

FIGS. 1 and 2 show a hybrid outboard motor 1 according to an embodiment of the present invention as viewed from the left side thereof. FIG. 1 shows a state in which an electric propulsion part 33 sinks below the water surface, and FIG. 2 shows a state in which the electric propulsion part 33 comes out of the water surface. FIG. 3 shows the hybrid outboard motor 1 in FIG. 1 as viewed from the rear side thereof. FIG. 4 shows the hybrid outboard motor 1 in FIG. 1 as viewed from above.

The hybrid outboard motor 1 is an outboard motor that uses both an internal combustion engine and an electric motor as power sources. As shown in FIG. 3, the hybrid outboard motor 1 includes an internal-combustion-drive propulsion part 11 and two electric propulsors 31 and 32. The internal-combustion-drive propulsion part 11 is a portion that generates a propulsive force of a ship by the internal combustion engine. On the other hand, each of the electric propulsors 31 and 32 includes the electric propulsion part 33, and the electric propulsion part 33 is a portion that generates a propulsive force of the ship by the electric motor. Hereinafter, the hybrid outboard motor 1 is simply referred to as an "outboard motor 1".

(Internal-Combustion-Drive Propulsion Part)

As shown in FIG. 1, the internal-combustion-drive propulsion part 11 includes an internal combustion engine 12 provided in an upper portion of the outboard motor 1, a drive shaft 13 extending in an upper-lower direction in an intermediate portion in the upper-lower direction of the outboard motor 1, a gear mechanism 14 provided in a lower portion of the outboard motor 1, a propeller shaft 15 provided in the lower portion of the outboard motor 1 and extending in a front-rear direction, and a propeller 16 attached to a rear end side portion of the propeller shaft 15.

The internal combustion engine 12 is, for example, a four-stroke engine using gasoline as fuel. Power output from the internal combustion engine 12 is transmitted to the propeller shaft 15 via the drive shaft 13 and the gear mechanism 14. Accordingly, the propeller shaft 15 rotates based on the power of the internal combustion engine 12. The propeller 16 rotates together with the propeller shaft 15 to generate a propulsive force of the ship. In addition, the gear mechanism 14 includes a clutch (not shown), and by the operation of the clutch, it is possible to switch whether to transmit the power of the internal combustion engine 12 to the propeller shaft 15, and to switch a rotation direction of the propeller shaft 15.

In addition, the internal-combustion-drive propulsion part 11 includes a top cowl 18, a bottom cowl 19, an upper case 20, a middle case 21, and a gear case 22 (lower case). For convenience of understanding, in the middle case 21 in FIGS. 1 and 2, portions exposed to the outside are marked with dot patterns.

The top cowl 18 and the bottom cowl 19 cover the internal combustion engine 12. The drive shaft 13 is housed in the upper case 20 and the middle case 21. A front end side portion of the gear mechanism 14 and the propeller shaft 15 is housed in the gear case 22. In addition, an anti-cavitation plate 23 that prevents air from being sucked into the propeller 16 is provided above the propeller 16 in an upper side portion of a rear portion of the gear case 22. In addition, a clamp bracket 24 for attaching and fixing the outboard motor 1 to a transom of the ship is provided in front of the upper case 20. A swivel bracket 25 is attached to the clamp bracket 24, and the outboard motor 1 is rotatably supported by the swivel bracket 25 via a steering shaft 26 such that the orientation of the outboard motor 1 in a left-right direction can be changed.

The propeller shaft 15 is a specific example of a "first propeller shaft". In addition, the drive shaft 13 and the gear mechanism 14 are specific examples of a "power transmission mechanism". In addition, the propeller 16 is a specific example of a "first propeller". In addition, the top cowl 18, the bottom cowl 19, the upper case 20, the middle case 21, and the gear case 22 are specific examples of a "first housing part". In addition, the clamp bracket 24 is a specific example of a "fixing bracket".

(Electric Propulsor)

As described above, the outboard motor 1 includes the two electric propulsors 31 and 32. As shown in FIG. 3, the electric propulsor 31 is disposed on a left side of the internal-combustion-drive propulsion part 11, and the electric propulsor 32 is disposed on a right side of the internal-combustion-drive propulsion part 11. The electric propulsors 31 and 32 are disposed symmetrically in the left-right direction with respect to the internal-combustion-drive propulsion part 11. In addition, as shown in FIG. 4, when the outboard motor 1 is viewed from above, the two electric propulsors 31 and 32 are disposed such that propeller shafts 35 thereof form an inverted V shape. In addition, the electric propulsors 31 and 32 are configured such that the respective components are symmetrical to each other in the left-right direction, and the functions and the structures of the electric propulsors 31 and 32 are substantially the same. Hereinafter, only the function and structure of the electric propulsor 31 will be described in detail.

Figure 5:
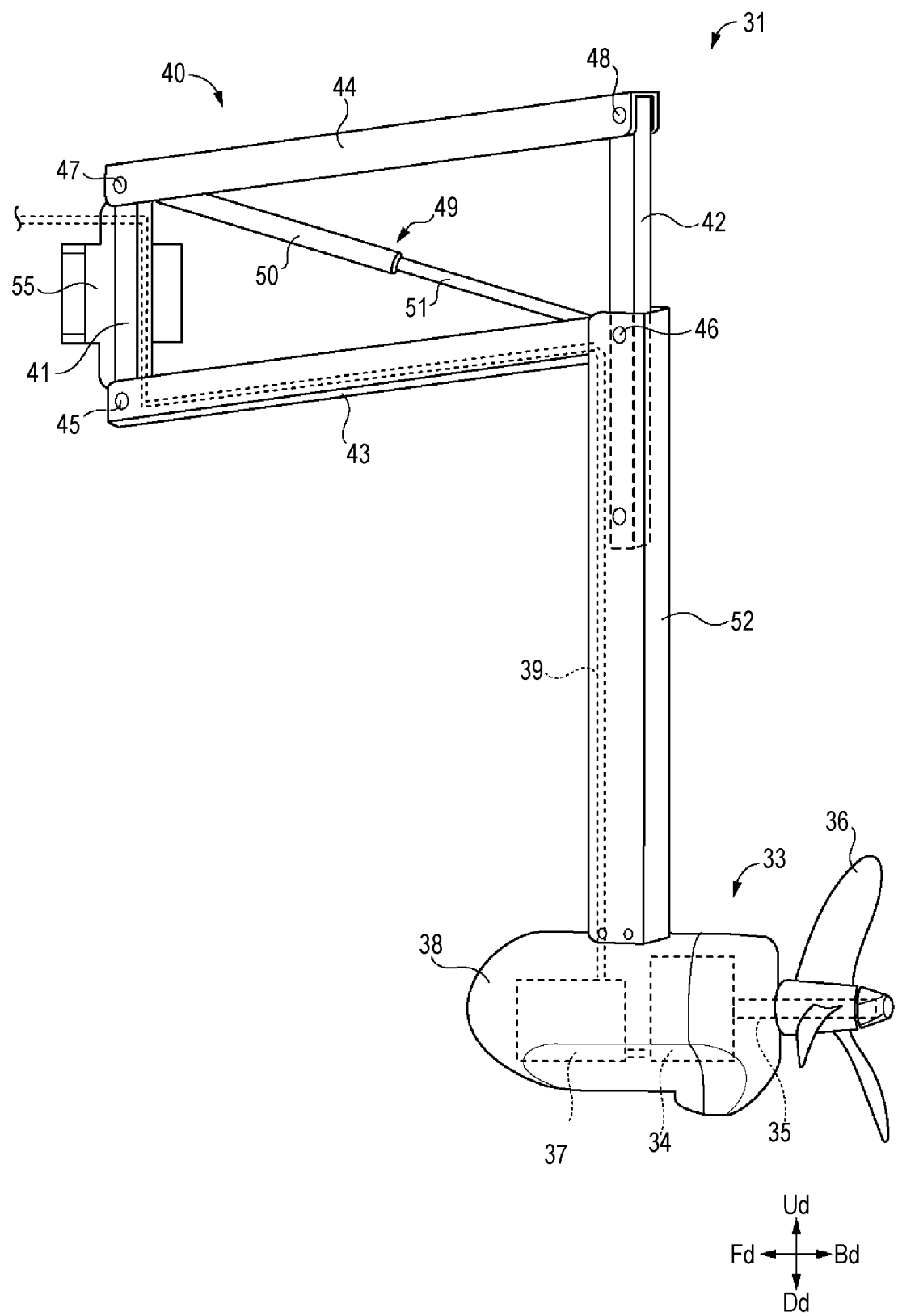
FIG. 5 is an explanatory view showing an electric propulsor of the hybrid outboard motor according to the embodiment of the present invention.

FIG. 5 shows the electric propulsor 31. As shown in FIG. 5, the electric propulsor 31 includes an electric propulsion part 33, an elevating device 40, and an attachment bracket 55.

(Electric Propulsion Part)

The electric propulsion part 33 includes an electric motor 34, the propeller shaft 35, a propeller 36, an inverter 37, and a housing case 38.

The electric motor 34 is, for example, a brushless motor. As shown in FIG. 1, when the outboard motor 1 is viewed from the side, an axis B of the propeller shaft 35 extends horizontally in the front-rear direction similarly to an axis A of the propeller shaft 15 of the internal-combustion-drive propulsion part 11. In addition, as shown in FIG. 4, when the outboard motor 1 is viewed from above, the axis B of the propeller shaft 35 in the electric propulsor 31 on the left side is inclined, for example, by about 20 degrees with respect to the axis A of the propeller shaft 15 of the internal-combustion-drive propulsion part 11 such that the rear end side of the propeller shaft 35 is located on the left side with respect to the front end side of the propeller shaft 35. In addition, as shown in FIG. 5, a front end portion of the propeller shaft 35 is connected to an output shaft of the electric motor 34. The propeller shaft 35 rotates together with the output shaft of the electric motor 34, and transmits the rotation of the electric motor 34 to the propeller 36.

The propeller 36 is attached to a rear end side portion of the propeller shaft 35. The propeller 36 rotates together with the propeller shaft 35 to generate a propulsive force of the ship.

The inverter 37 is a circuit that controls driving of the electric motor 34. As shown in FIG. 5, the electric motor 34, a front end side portion of the propeller shaft 35, and the inverter 37 are housed in the housing case 38. The housing case 38 has a complete waterproof structure for preventing water from entering the housing case 38.

In addition, a harness 39, which includes a cable for sending a control signal for controlling the driving of the electric motor 34 to the inverter 37, a cable for supplying electric power to the electric motor 34 and the inverter 37, and the like, is connected to the electric propulsion part 33. The harness 39 is wired along a first link member 41, a third link member 43, and a support member 52 of the elevating device 40.

The propeller shaft 35 is a specific example of a "second propeller shaft". The propeller 36 is a specific example of a "second propeller". The housing case 38 is a specific example of a "second housing part".

(Elevating Device)

Figure 6:
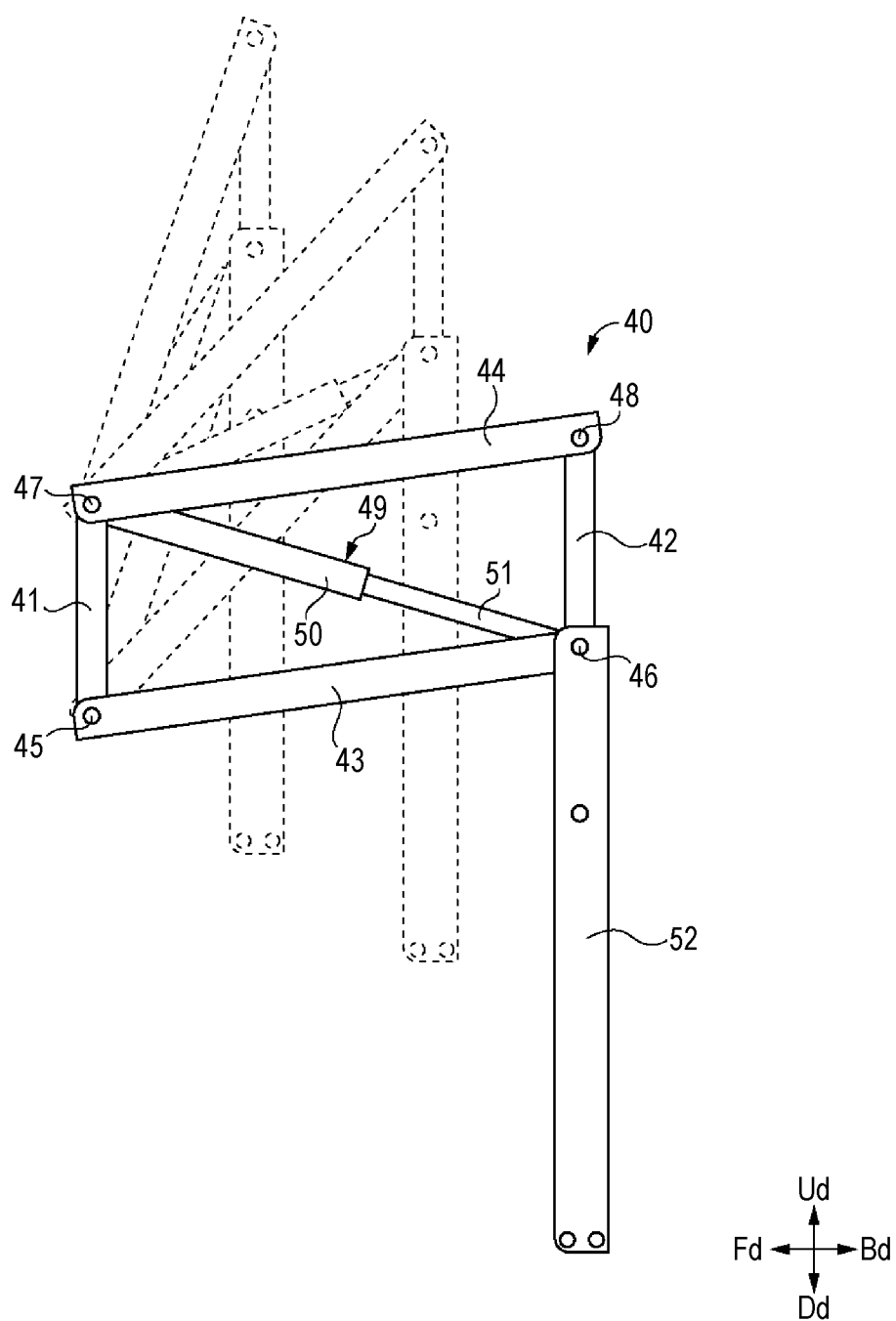
FIG. 6 is an explanatory view showing an elevating device in the electric propulsor of the hybrid outboard motor according to the embodiment of the present invention.

FIG. 6 shows the elevating device 40. The elevating device 40 is a device that elevates and lowers the electric propulsion part 33 between a position where the propeller 36 sinks below the water surface as shown in FIG. 1 and a position where the propeller 36 comes out of the water surface as shown in FIG. 2. The elevating device 40 elevates and lowers the electric propulsion part 33 while maintaining a state in which the propeller shaft 35 extends horizontally.

As shown in FIG. 6, the elevating device 40 includes four link members, that is, the first link member 41, a second link member 42, the third link member 43, and a fourth link member 44, and an actuator 49. The four link members 41 to 44 form a link mechanism, and more specifically, form a parallel crank mechanism.

Specifically, each of the link members 41 to 44 is made of, for example, a metal material, and is formed in a bar shape having a U-shaped cross section. The first link member 41 extends in the upper-lower direction. The second link member 42 extends in the upper-lower direction parallel to the first link member 41. A front end side of the third link member 43 is rotatably joined to a lower end side of the first link member 41 via a joining pin 45, and a rear end side of the third link member 43 is rotatably joined to a lower end side of the second link member 42 via a joining pin 46. The fourth link member 44 extends parallel to the third link member 43. In addition, a front end side of the fourth link member 44 is rotatably joined to an upper end side of the first link member 41 via a joining pin 47, and a rear end side of the fourth link member 44 is rotatably joined to an upper end side of the second link member 42 via a joining pin 48.

The actuator 49 is, for example, a hydraulic cylinder. An electric cylinder may be used as the actuator 49. A front end portion of a cylinder tube 50 of the actuator 49 is rotatably joined to the upper end side of the first link member 41 via the joining pin 47. In addition, a rear end portion of a rod 51 of the actuator 49 is rotatably joined to the rear end side of the third link member 43 via the joining pin 46. In addition, although not shown in the drawings, the actuator 49 is connected to a hydraulic conduit through which hydraulic oil flows between an actuator control device 79 (see FIG. 8) and the actuator 49. The actuator 49 rotates the third link member 43 and the fourth link member 44 with respect to the first link member 41, and moves the second link member 42 in the upper-lower direction by extending and contracting the rod 51 with respect to the cylinder tube 50.

In addition, as shown in FIG. 5, an upper end side portion of the support member 52 extending in the upper-lower direction is fixed to a lower end side portion of the second link member 42. In addition, an upper portion of the housing case 38 of the electric propulsion part 33 is fixed to a lower end portion of the support member 52. The electric propulsion part 33 is driven by the actuator 49 to move in the upper-lower direction while maintaining a state in which the propeller shaft 35 extends horizontally.

(Attachment Bracket)

Figure 7:
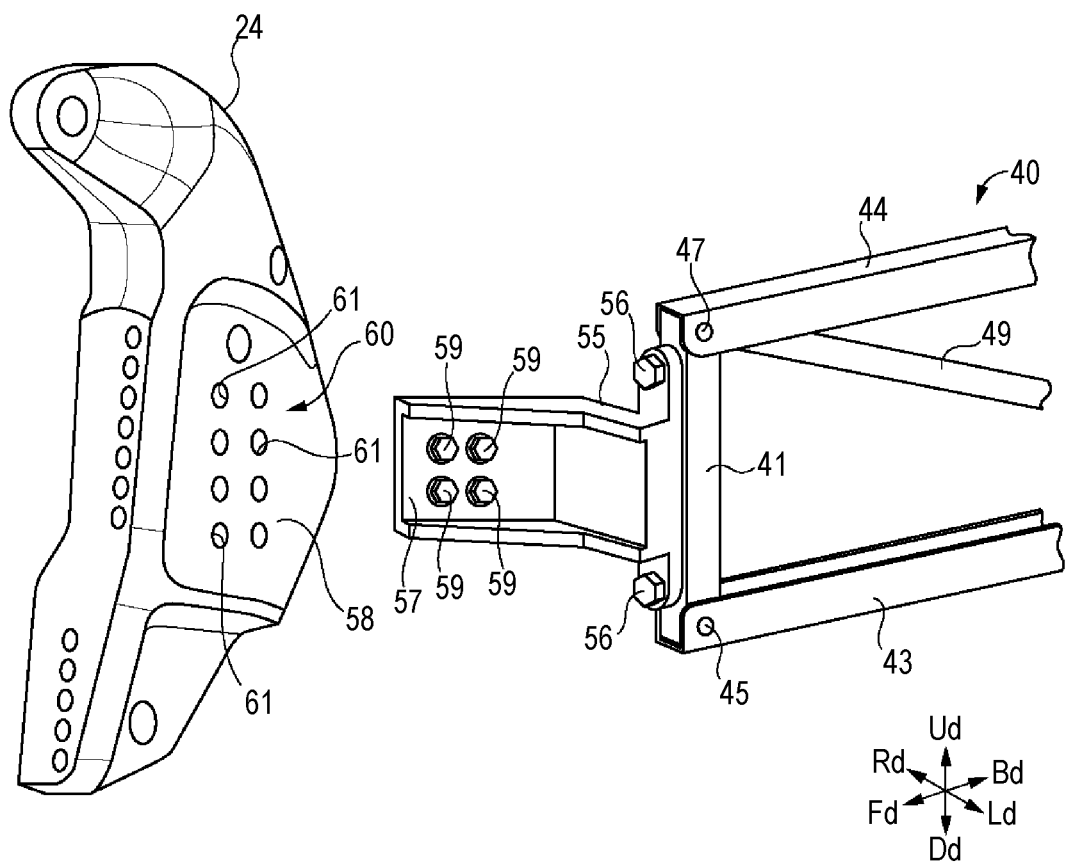
FIG. 7 is an explanatory view showing an attachment structure of the electric propulsor of the hybrid outboard motor according to the embodiment of the present invention.

FIG. 7 shows a left side portion of the clamp bracket 24, the attachment bracket 55, and a front side portion of the elevating device 40. The attachment bracket 55 is a member for attaching the elevating device 40, to which the electric propulsion part 33 is fixed, to the clamp bracket 24. The attachment bracket 55 is formed of, for example, a metal material, and extends substantially in the left-right direction as shown in FIGS. 3 and 4. As shown in FIG. 7, the first link member 41 of the elevating device 40 is fixed to a left end portion (front end portion) of the attachment bracket 55 by using a fixing member 56 such as a bolt.

In addition, a right end portion (base end portion) of the attachment bracket 55 is attached to a left side portion of the clamp bracket 24. Specifically, the right end portion of the attachment bracket 55 is provided with an attachment part 57 for attaching the electric propulsor 31, which includes the attachment bracket 55, the elevating device 40 fixed to the attachment bracket 55, and the electric propulsion part 33 fixed to the elevating device 40, to the clamp bracket 24. On the other hand, an attachment surface 58 is provided on the left side portion of the clamp bracket 24. The electric propulsor 31 is attached by fixing the attachment part 57 of the attachment bracket 55 to the attachment surface 58 of the clamp bracket 24 using the fixing member 59 such as a bolt. According to this attachment structure, the electric propulsor 31 can be easily externally attached to the clamp bracket 24. In addition, according to this attachment structure, the electric propulsor 31 can be easily attached to and detached from the clamp bracket 24.

In addition, the attachment surface 58 of the clamp bracket 24 has an attachment position changing structure 60 capable of changing the attachment position of the electric propulsor 31 with respect to the clamp bracket 24 in the upper-lower direction. Specifically, a plurality of holes 61

(for example, threaded bolt holes) through which the fixing member 59 can be fixed (fastened) are arranged in the upper-lower direction in the attachment surface 58. By selecting a hole for fixing the fixing member 59 from among the plurality of holes 61, the attachment position of the electric propulsor 31 in the upper-lower direction can be selected. Such an attachment position changing structure may be provided not on the attachment surface 58 of the clamp bracket 24 but on the attachment part 57 of the attachment bracket 55.

(Elevating and Lowering of Electric Propulsion Part)

The elevating device 40 elevates or lowers the electric propulsion part 33 in accordance with a sailing state of the ship. In the present embodiment, the elevating devices 40 of the two electric propulsors 31 and 32 are basically controlled so as to be in conjunction with each other. Specifically, during low-speed sailing which is not a planing state of the ship, as shown in FIG. 1, the elevating device 40 lowers the electric propulsion part 33 such that the propeller 36 sinks below the water surface. A two-dot chain line S1 in FIG. 1 indicates a position of the water surface during low-speed movement which is not a planing state of the ship. During low-speed movement which is not a planing state of the ship, most of the portion of the middle case 21 that is exposed to the outside (the portion with a dot pattern in the drawing) and the entire gear case 22 sink below the water surface, and the anti-cavitation plate 23 also sinks below the water surface. During low-speed movement which is not a planing state of the ship, the elevating device 40 sets the position of the electric propulsion part 33 to, for example, a position equal to or lower than the position of the anti-cavitation plate 23 sinking below the water surface. Accordingly, during low-speed movement which is not a planing state of the ship, the position of the electric propulsion part 33 is lower than a water surface S1, and the propeller 36 sinks below the water surface.

During low-speed movement which is not a planing state of the ship, the electric motor 34 is driven and the propeller 36 is rotated in accordance with the steering of the ship by a user. Since the propeller 36 of the electric propulsion part 33 sinks below the water surface during low-speed movement which is not a planing state of the ship, it is possible to apply a propulsive force to the ship by rotating the propeller 36.

In addition, since the draft varies depending on the number of occupants of the ship, the weight of the cargo, and the like, the position of the water surface S1 with respect to the outboard motor 1 during low-speed movement, which is not a planing state of the ship, changes. According to the outboard motor 1, the position of the electric propulsion part 33 in the upper-lower direction can be adjusted in accordance with such a change in the water surface S1, by operating the elevating device 40 to elevate or lower the electric propulsion part 33 by a small amount.

On the other hand, during planing of the ship, as shown in FIG. 2, the elevating device 40 elevates the electric propulsion part 33 such that all or most of the electric propulsion part 33 including the propeller 36 comes out of the water surface. A two-dot chain line S2 in FIG. 2 indicates a position of the water surface during planing of the ship. During planing of the ship, the ship and the outboard motor 1 float and the positions of the ship and the outboard motor 1 with respect to the water surface become higher than that during low-speed movement which is not a planing state of the ship. During planing of the ship, the position of the water surface becomes equivalent to the position of the anti-cavitation plate 23, and the entire middle case 21 and the upper portion of the gear case 22 (the portion above the anti-cavitation plate 23) come out of the water surface. During planing of the ship, the elevating device 40 sets the position of the electric propulsion part 33 to a position above at least the anti-cavitation plate 23. Accordingly, during planing of the ship, all or most of the electric propulsion part 33 including the propeller 36 is located above the water surface S2. In the present embodiment, during planing of the ship, the elevating device 40 elevates the electric propulsion part 33 to a position that is equal to or higher than the upper portion of the portion of the middle case 21 exposed to the outside beyond the anti-cavitation plate 23.

During planing of the ship, the driving of the electric motor 34 is stopped, and the rotation of the propeller 36 is stopped. During planing of the ship, all or most of the electric propulsion part 33 including the propeller 36 comes out of the water surface, and therefore, it is possible to prevent resistance to the movement of the ship. That is, if all or most of the electric propulsion part 33 including the propeller 36 sinks below the water surface during planing of the ship, the resistance generated by water hitting the electric propulsion part 33 hinders the movement of the ship. In the present embodiment, all or most of the electric propulsion part 33 comes out of the water surface during planing of the ship, and therefore, it is possible to prevent the generation of such resistance.

In addition, in the present embodiment, as shown in FIG. 2, by the elevating device 40, the electric propulsion part 33 can be elevated to a position equal to or higher than the upper portion of the portion of the middle case 21 exposed to the outside. This position is higher than the water surface S1 during low-speed sailing which is not in a planing state of the ship. Accordingly, according to the elevating device 40 of the present embodiment, the electric propulsion part 33 can come out of the water surface not only during planing of the ship but also during low-speed sailing which is not the planing state of the ship. During low-speed sailing which is not the planing state of the ship, the outboard motor 1 normally causes the electric propulsion part 33 to sink below the water surface by the elevating device 40, and generates a propulsive force of the ship by the driving of the electric motor 34 of the electric propulsion part 33 and the driving of the internal combustion engine 12 of the internal-combustion-drive propulsion part 11. However, for example, in accordance with the operation of the operator of the ship, during low-speed sailing which is not the planing state of the ship, the outboard motor 1 can stop the driving of the electric motor 34 of the electric propulsion part 33, operate the elevating device 40 to cause the electric propulsion part 33 to come out of the water surface, and generate the propulsive force of the ship only by the driving the internal combustion engine 12.

In addition, when the outboard motor 1 is viewed from the side and the electric propulsion part 33 is located at a position sunk below the water surface as shown in FIG. 1, the electric propulsion part 33 is located on the rear side of the drive shaft 13. On the other hand, as shown in FIG. 2, when the electric propulsion part 33 is located at a position out of the water surface, the electric propulsion part 33 is located on the front side of the drive shaft 13 or at the same position as the drive shaft 13. As described above, according to the outboard motor 1, during planing the ship, as shown in FIG. 2, the elevating device 40 is folded and the electric propulsion part 33 can be disposed at a position close to the clamp bracket 24. Accordingly, the electric propulsion part 33 can be prevented from swinging due to an impact or vibration caused by a collision and the like between the ship and the water surface during planing of the ship, and the electric propulsion part 33 can be stably supported.

(Movement Control of Ship)

Figure 8:
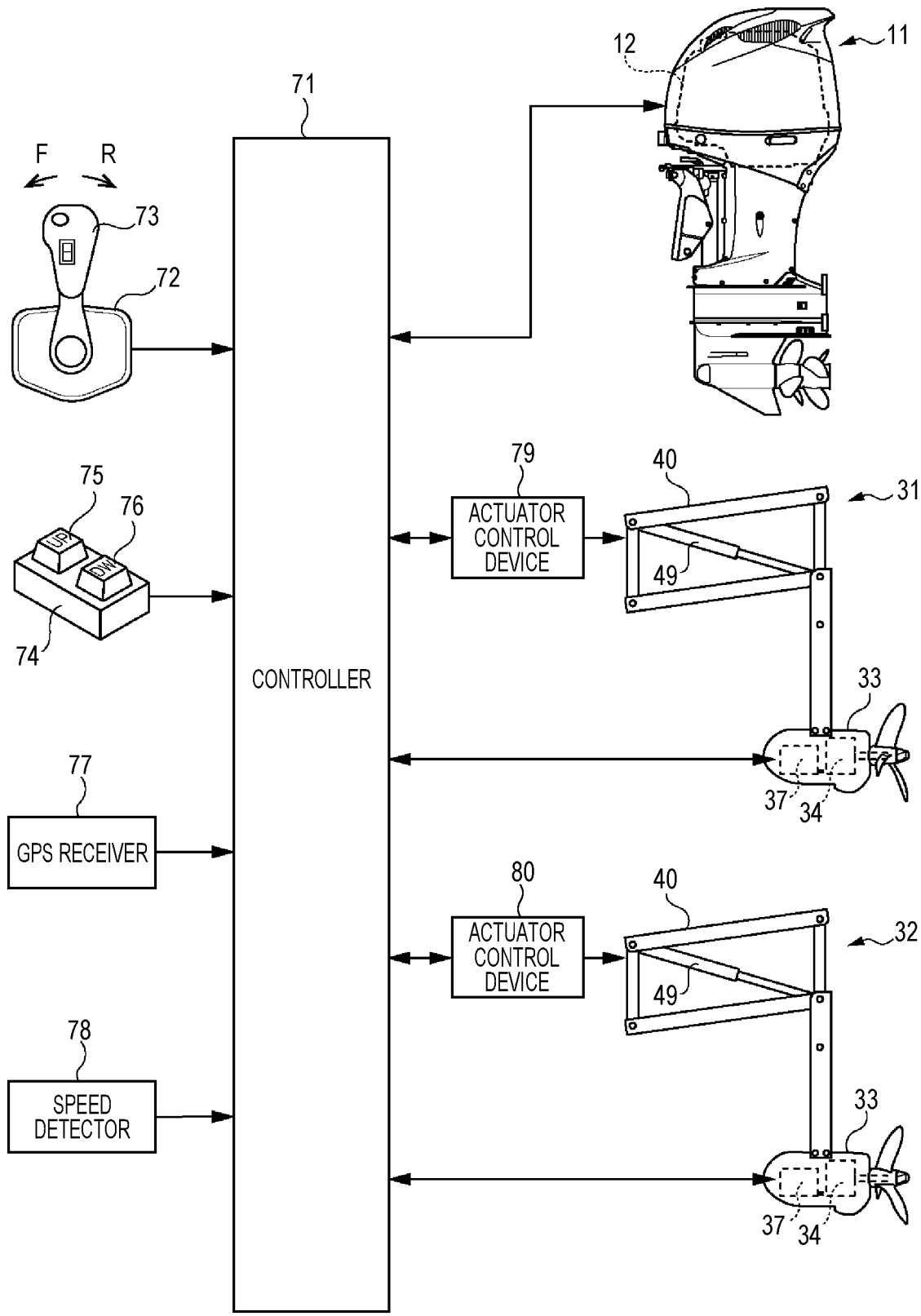
FIG. 8 is an explanatory view showing an electrical configuration of the hybrid outboard motor according to the embodiment of the present invention.

FIG. 8 shows an electrical configuration of the outboard motor 1. For example, a controller 71 is provided at the upper portion of the outboard motor 1. The controller 71 includes a microcomputer and the like. As shown in FIG. 8, a remote controller 72, an elevating operation device 74, a global positioning system (GPS) receiver 77, and a speed detector 78 are connected to an input side of the controller 71. The speed detector 78 is a device that detects a speed of the ship. In addition, the internal-combustion-drive propulsion part 11, the actuator control device 79 that controls the actuator 49 of the elevating device 40 of the electric propulsor 31 on the left side, the inverter 37 of the electric propulsion part 33 of the electric propulsor 31 on the left side, an actuator control device 80 that controls the actuator 49 of the elevating device 40 of the electric propulsor 32 on the right side, and the inverter 37 of the electric propulsion part 33 of the electric propulsor 32 on the right side are connected to an output side of the controller 71. Each of the actuator control devices 79 and 80 includes, for example, a hydraulic circuit. The remote controller 72, the elevating operation device 74, the GPS receiver 77, the speed detector 78, and the actuator control devices 79 and 80 are provided in the ship. In addition, the controller 71 is a specific example of an "elevating controller".

An operator of the ship operates a lever 73 of the remote controller 72 to tilt the lever 73 in an F direction or an R direction in FIG. 8 to operate the clutch, thereby switching whether to transmit the power of the internal combustion engine 12 to the propeller shaft 15 and switching the rotation direction of the propeller shaft 15. In addition, the operator can increase or decrease the rotation speed of the internal combustion engine 12 by performing the operation of tilting the lever 73 of the remote controller 72 in the F direction or the R direction. In addition, the operator can switch between driving and stopping of the electric motor 34 of the electric propulsion part 33 of each of the electric propulsors 31 and 32, and increase or decrease the rotation speed of the electric motor 34 by performing the operation of tilting the lever 73 of the remote controller 72 in the F direction or the R direction.

In addition, the operator can operate the actuator 49 of the elevating device 40 of the electric propulsor 31 on the left side and the actuator 49 of the elevating device 40 of the electric propulsor 32 on the right side by operating the elevating operation device 74. These two actuators 49 operate in conjunction with each other in accordance with the operation of the elevating operation device 74. Specifically, when the operator presses an elevating button 75 of the elevating operation device 74, in each of the electric propulsors 31 and 32, the actuator 49 of the elevating device 40 contracts at the same time, and the electric propulsion part 33 elevates at the same time. In addition, when the operator presses a lowering button 76 of the elevating operation device 74, in each of the electric propulsors 31 and 32, the actuator 49 of the elevating device 40 extends at the same time, and the electric propulsion part 33 lowers at the same time.

In addition, when the operator brings the lever 73 of the remote controller 72 into a neutral position (a state in which the lever 73 is not inclined in both the F direction and the R direction), the controller 71 stops the internal combustion engine 12 (or brings the internal combustion engine 12 into an idling state in which the power of the internal combustion engine 12 is not transmitted to the propeller shaft 15). In addition, when the operator brings the lever 73 of the remote controller 72 into the neutral position and the electric propulsion part 33 of each of the electric propulsors 31 and 32 sinks below the water surface, the controller 71 stops the electric motor 34 of the electric propulsion part 33 of each of the electric propulsors 31 and 32. When the electric propulsion part 33 of each of the electric propulsors 31 and 32 comes out of the water surface, the controller 71 basically stops the electric motor 34 of each electric propulsion part 33.

In addition, when the operator operates the elevating operation device 74 to lower the electric propulsion part 33 of each of the electric propulsors 31 and 32 and sink the electric propulsion part 33 under the water surface, and then tilts the lever 73 of the remote controller 72 slightly in the F direction in order to move the ship forward at an extremely low speed, the controller 71 drives the electric motor 34 of the electric propulsion part 33 of each of the electric propulsors 31 and 32 to rotate the propeller 36 in a normal direction while maintaining the internal combustion engine 12 in a stopped state (or an idling state). Accordingly, the ship moves forward at an extremely low speed by the propulsive force of the electric propulsion part 33 of each of the electric propulsors 31 and 32.

In addition, in a state where the electric propulsion part 33 of each of the electric propulsors 31 and 32 sinks below the water surface, when the operator tilts the lever 73 of the remote controller 72 to a middle degree in the F direction in order to move the ship forward at a low speed, which is not an extremely low speed but does not reach the planing state, the controller 71 operates the internal combustion engine 12 at a low rotation speed, transmits the rotation to the propeller shaft 15 to rotate the propeller 16 in the normal direction, and drives the electric motor 34 of the electric propulsion part 33 of each of the electric propulsors 31 and 32 to rotate the propeller 36 in the normal direction. Accordingly, the ship moves forward at a low speed by the propulsive force of the internal-combustion-drive propulsion part 11 and the propulsive force of the electric propulsion part 33 of each of the electric propulsors 31 and 32.

In addition, in a state where the electric propulsion part 33 of each of the electric propulsors 31 and 32 sinks below the water surface, when the operator largely tilts the lever 73 of the remote controller 72 in the F direction in order to move the ship forward in the planing state, the controller 71 first operates the internal combustion engine 12 at a high rotation speed to rotate the propeller 16 in the normal direction at a high speed, and drives the electric motor 34 of the electric propulsion part 33 of each of the electric propulsors 31 and 32 to rotate the propeller 36 in the normal direction. Accordingly, the ship is accelerated by the propulsive force of the internal-combustion-drive propulsion part 11 and the propulsive force of the electric propulsion part 33 of each of the electric propulsors 31 and 32. Then, when the ship reaches the planing state, the controller 71 recognizes that the ship reaches the planing state based on the speed of the ship, and stops the electric motor 34 of the electric propulsion part 33 of each of the electric propulsors 31 and 32 while maintaining the operation of the internal combustion engine 12. Subsequently, the controller 71 transmits control signals for elevating the electric propulsion part 33 of each of the electric propulsors 31 and 32 and moving the electric propulsion part 33 out from the water surface, to the actuator control devices 79 and 80, respectively. In response to this, the actuator control devices 79 and 80 control the elevating device 40 of each of the electric propulsors 31 and 32, to automatically elevate the electric propulsion part 33 of each of the electric propulsors 31 and 32 and move the electric propulsion part 33 out from the water surface. Accordingly, the ship slides only by the propulsive force of the internal-combustion-drive propulsion part 11.

In addition, the controller 71 recognizes that the ship has reached the planing state, for example, as follows. That is, the controller 71 detects the speed of the ship by the speed detector 78, and based on the detection result of the speed detector 78, recognizes that the ship has reached the planing state when the speed of the ship exceeds a predetermined reference speed at which the ship reaches the planing state.

In addition, based on position information of the ship received by the GPS receiver 77, the controller 71 can perform control (automatic movement control) of automatically moving the ship at a low speed to a position set by the operator, and control (fixed point keeping control) of keeping the ship at the current position against waves and tides.

Figure 9A:
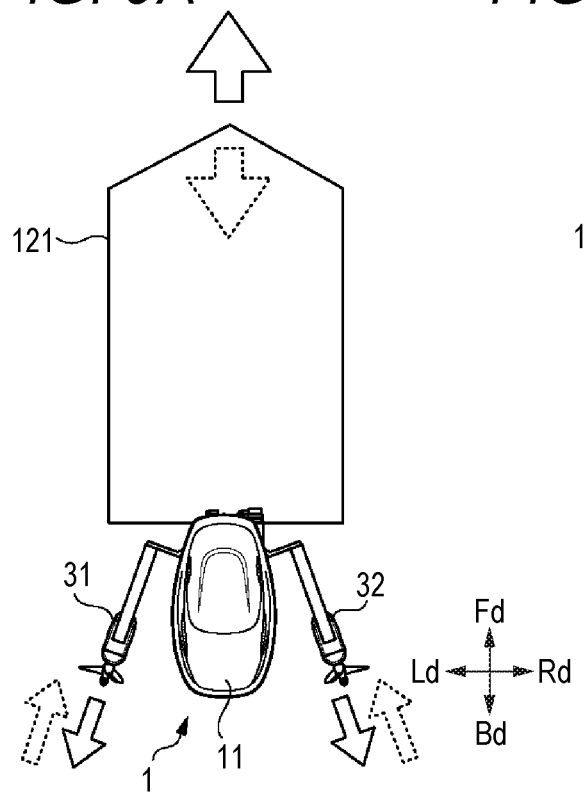
FIGS. 9A to 9D are an explanatory view showing movement control of a ship by the hybrid outboard motor according to the embodiment of the present invention.
Figure 9B:
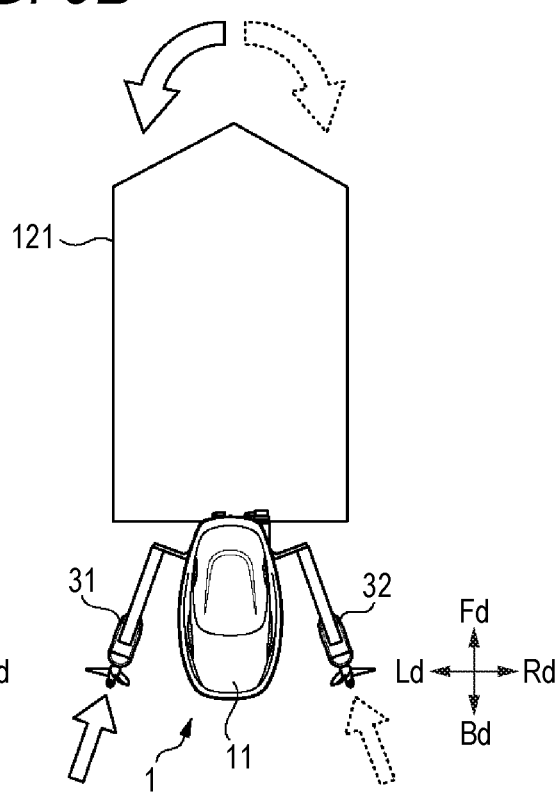
Figure 9C:
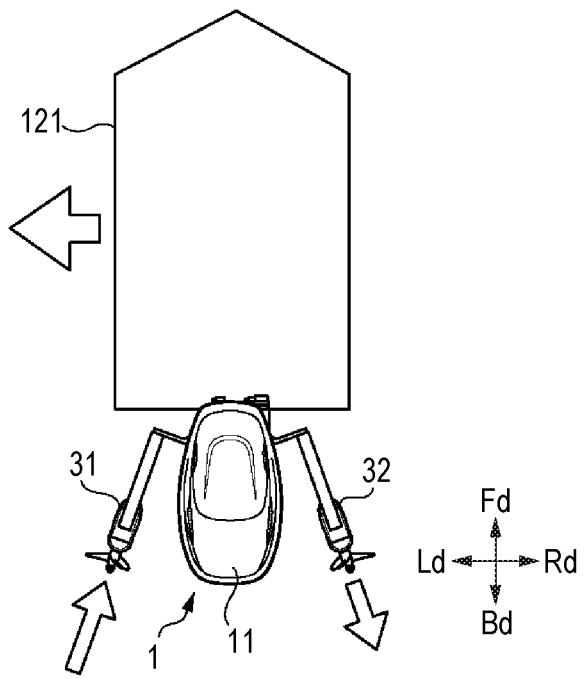
Figure 9D:
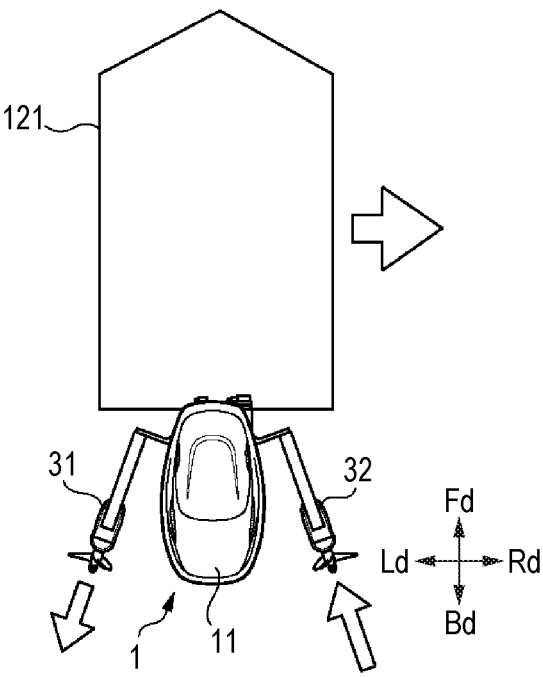

Specifically, when the automatic movement control or the fixed point keeping control is performed, the electric propulsion part 33 of each of the electric propulsors 31 and 32 sinks below the water surface in advance. In a state where the electric propulsion part 33 of each of the electric propulsors 31 and 32 sinks below the water surface, as shown in FIG. 9A, the controller 71 controls the driving of the electric motor 34 of each of the electric propulsors 31 and 32 to cause the propeller 36 of each of the electric propulsors 31 and 32 to rotate in the normal direction at the same time to generate water flow in directions shown by solid arrows near the electric propulsors 31 and 32 or in the reverse direction at the same time to generate water flow in directions shown by dashed arrows near the electric propulsors 31 and 32, thereby allowing a ship 121 to move forward at a low speed in a direction shown by a solid arrow near the ship 121 or backward at a low speed in a direction shown by a dashed arrow near the ship 121. In addition, as shown in FIG. 9B, the controller 71 controls the driving of the electric motor 34 of the electric propulsor 31 on the left side to rotate the propeller 36 of the electric propulsor 31 on the left side in the reverse direction to generate water flow in a direction shown by a solid arrow near the electric propulsor 31, and stops the electric motor 34 of the electric propulsor 32 on the right side to stop the propeller 36 of the electric propulsor 32 on the right side, thereby turning the ship 121 to the left in a direction shown by a solid arrow near the ship 121. In addition, as shown by dashed arrows in FIG. 9B, the controller 71 controls the driving of the electric motor 34 of the electric propulsor 32 on the right side to rotate the propeller 36 of the electric propulsor 32 on the right side in the reverse direction to generate water flow in a direction shown by a dashed arrow near the electric propulsor 32, and stops the electric motor 34 of the electric propulsor 31 on the left side to stop the propeller 36 of the electric propulsor 31 on the left side, thereby turning the ship 121 to the right in a direction shown by a dashed arrow near the ship 121. In addition, as shown in FIG. 9C, the controller 71 controls the driving of the electric motor 34 of the electric propulsor 31 on the left side to rotate the propeller 36 of the electric propulsor 31 on the left side in the reverse direction to generate water flow in a direction shown by a solid arrow near the electric propulsor 31, and controls the driving of the electric motor 34 of the electric propulsor 32 on the right side to rotate the propeller 36 of the electric propulsor 32 on the right side in the normal direction to generate water flow in a direction shown by a solid arrow near the electric propulsor 32, thereby moving the ship 121 to the left in a direction shown by a solid arrow near the ship 121. In addition, as shown in FIG. 9D, the controller 71 controls the driving of the electric motor 34 of the electric propulsor 32 on the right side to rotate the propeller 36 of the electric propulsor 32 on the right side in the reverse direction to generate water flow in a direction shown by a solid arrow near the electric propulsor 32, and controls the driving of the electric motor 34 of the electric propulsor 31 on the left side to rotate the propeller 36 of the electric propulsor 31 on the left side in the normal direction to generate water flow in a direction shown by a solid arrow near the electric propulsor 31, thereby moving the ship 121 to the right in a direction shown by a solid arrow near the ship 121.

The controller 71 can recognize the current position of the ship based on the position information of the ship received by the GPS receiver 77, determine the movement direction of the ship based on the current position of the ship and the position set by the operator, and control the driving of the electric motor 34 of each of the electric propulsors 31 and 32 to automatically move the ship in the direction. In addition, the controller 71 can recognize the current position of the ship based on the position information of the ship received by the GPS receiver 77, and when the current position of the ship deviates from a certain position due to waves or tides, the controller 71 can control the driving of the electric motor 34 of each of the electric propulsors 31 and 32 to automatically move the ship such that the ship returns to the certain position, and can keep the ship at the certain position.

As described above, the outboard motor 1 according to the embodiment of the present invention includes the elevating device 40 that elevates and lowers the electric propulsion part 33 between the position where the propeller 36 sinks below the water surface and the position where the propeller 36 comes out of the water surface. According to the outboard motor 1, during planing of the ship, the electric propulsion part 33 is elevated by the elevating device 40 such that all or most of the electric propulsion part 33 including the propeller 36 comes out of the water surface, and therefore, the resistance generated by the water hitting the electric propulsion part 33 during the planing of the ship can be reduced, and the sailing performance of the ship during the planing can be prevented from being lowered by the resistance. In addition, by making it difficult for water to hit the propeller 36 during planing of the ship, it is possible to enhance the effect of reducing the resistance, and to effectively prevent a decrease in the sailing performance of the ship during planing.

In addition, the elevating device 40 in the outboard motor 1 of the present embodiment elevates and lowers the electric propulsion part 33 while maintaining a state in which the propeller shaft 35 extends horizontally. Accordingly, by controlling the elevating device 40, it is possible to change a distance between the propeller 36 under the water surface and the water surface in a state in which the propeller shaft 35 of the electric propulsion part 33 is kept horizontal. Accordingly, it is possible to easily adjust the distance between the propeller 36 under the water surface and the water surface according to the number of occupants of the ship, the weight of the cargo, and the like.

In addition, the elevating device 40 in the outboard motor 1 of the present embodiment includes the four link members 41 to 44 forming the parallel crank mechanism and the actuator 49. With this configuration, it is possible to easily perform the operation of elevating and lowering the electric propulsion part 33 while maintaining the state in which the propeller shaft 35 extends horizontally.

In addition, in the outboard motor 1 of the present embodiment, when the ship reaches a planing state, the controller 71 controls the elevating device 40 to automatically elevate the electric propulsion part 33 such that the propeller 36 of the electric propulsion part 33 comes out of the water surface. Accordingly, the operator does not need to perform an operation of elevating the electric propulsion part 33 when the ship is accelerated from a low-speed sailing state to the planing state. Therefore, the burden of the operation of the operator can be reduced.

In addition, in the outboard motor 1 of the present embodiment, the propeller 16 of the internal-combustion-drive propulsion part 11 and the propeller 36 of the electric propulsion part 33 are provided separately from each other, and are independent from each other. In addition, in the internal-combustion-drive propulsion part 11, a mechanism (the drive shaft 13, the gear mechanism 14, and the propeller shaft 15) for transmitting the power of the internal combustion engine 12 to the propeller 16 and the propeller shaft 35 of the electric propulsion part 33 are provided separately from each other, and are independent from each other. Therefore, according to the outboard motor 1 of the present embodiment, the propulsive force by the internal combustion engine and the propulsive force by the electric motor can be generated without using a complicated mechanism (for example, the mechanism having the automatic centrifugal clutch or a large number of gears as described in Patent Literature 1) that transmits the power of the internal combustion engine and the power of the electric motor to a common drive shaft. Therefore, it is possible to prevent the internal structure of the outboard motor 1 from becoming complicated.

In addition, in the outboard motor 1 of the present embodiment, the attachment bracket 55 for attaching the electric propulsion part 33 and the elevating device 40 to the clamp bracket 24 is provided with the attachment part 57, the clamp bracket 24 is provided with the attachment surface 58, and the electric propulsor 31 (or 32) is detachably attached to the clamp bracket 24 by fixing the attachment part 57 to the attachment surface 58 using the fixing member 59. Therefore, the user can easily attach or detach each of the electric propulsors 31 and 32 to or from the clamp bracket 24 according to the use of the outboard motor 1, which is highly convenient. In addition, according to the outboard motor 1 of the present embodiment, the electric propulsors 31 and 32 can be easily externally attached to a clamp bracket provided in an existing internal-combustion-driven outboard motor, and the existing internal-combustion-driven outboard motor can be easily hybridized.

In addition, the outboard motor 1 of the present embodiment has an attachment position changing structure capable of changing the attachment position of the electric propulsor 31 (or 32) with respect to the clamp bracket 24 in the upper-lower direction. Accordingly, the attachment position of each of the electric propulsors 31 and 32 can be easily adjusted according to the size and the like of the outboard motor.

In addition, in the outboard motor 1 of the present embodiment, the inverter 37 that controls the driving of the electric motor 34 is provided in the housing case 38 of the electric propulsion part 33 in each of the electric propulsors 31 and 32. By unitizing the electric motor and the inverter as described above, each of the electric propulsors 31 and 32 can be easily externally attached to the clamp bracket 24.

In addition, in the outboard motor 1 of the present embodiment, when the outboard motor 1 is viewed from above, the two electric propulsors 31 and 32 are disposed such that the propeller shafts 35 thereof form an inverted V shape. Accordingly, in addition to the forward movement, the backward movement, and the turning of the ship, the lateral movement of the ship (the ship is moved to the left or right without changing the orientation of the bow) can be easily performed. Therefore, it is possible to easily perform automatic movement, fixed point keeping of the ship, or docking and dedocking of the ship. In addition, the controller 71 according to the present embodiment can easily perform the automatic movement or the fixed point keeping of the ship using the GPS.

In addition, according to the outboard motor 1 of the present embodiment, the power source, the propeller, and the like include the electric propulsion part 33 independent of the internal-combustion-drive propulsion part 11. Therefore, for example, even when the internal-combustion-drive propulsion part 1I fails and does not operate during sailing, it is possible to bring the ship close to the coast by using the electric propulsion part 33.

In addition, in the outboard motor 1, each of the electric propulsors 31 and 32 is attached to the clamp bracket 24 for fixing the internal-combustion-drive propulsion part 11 to the ship. Therefore, by attaching the clamp bracket 24 to the ship, the internal-combustion-drive propulsion part 11 and each of the electric propulsors 31 and 32 can be fixed to the ship at the same time. Accordingly, both the propulsive force by the internal combustion engine and the propulsive force by the electric motor can be obtained. Therefore, in order to obtain the propulsive force by the internal combustion engine and the propulsive force by the electric motor, it is not necessary to attach the internal-combustion-driven outboard motor and the electric outboard motor to the ship, respectively. Therefore, even when the ship is small in size or even when a plurality of internal-combustion-driven outboard motors are already multi-mounted on the ship, the propulsive force by the internal combustion engine and the propulsive force by the electric motor can be obtained.

In addition, according to the outboard motor 1, a low speed torque before planing can be easily supplemented by each electric propulsion part 33. Accordingly, even if an internal combustion engine with enhanced torque performance in a high rotation speed range is used, a high sailing performance or a good acceleration performance of the ship in a low speed range can be ensured. In addition, since the low-speed movement of the ship can be supplemented by each electric propulsion part 33, by using a propeller for high-speed sailing as the propeller 16 of the internal-combustion-drive propulsion part 11, it is possible to improve the sailing performance in the high speed range without deteriorating the sailing performance in the low speed range. In addition, during the low-speed movement of the ship, the operation of the internal combustion engine 12 is stopped and the ship is moved only by the propulsive force of each electric propulsion part 33, and therefore, the ship can be moved at a low speed without generating noise. In addition, fuel efficiency can be improved by using the internal combustion engine and the electric motor in combination.

Figure 10A:
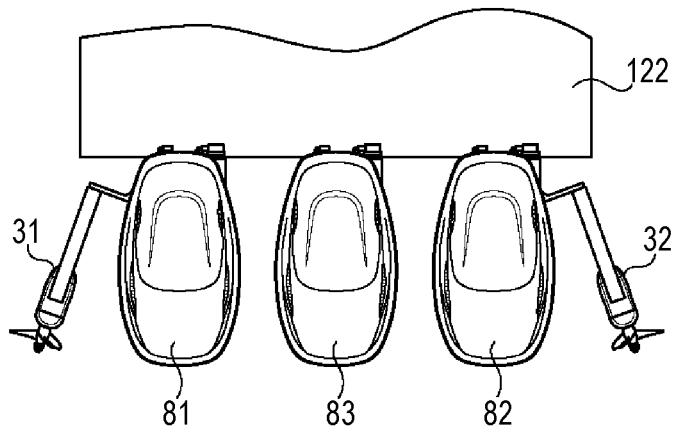
FIGS. 10A to 10D are an explanatory view showing some modifications and applications of the hybrid outboard motor according to the embodiment of the present invention.

In the above embodiment, the case where the two electric propulsors 31 and 32 are attached to the clamp bracket 24 of the outboard motor 1 has been described as an example, but a single electric propulsor 31 or 32 may be attached to the clamp bracket 24 of the outboard motor 1. For example, as shown in FIG. 10A, an outboard motor 81, in which the electric propulsor 31 is attached to the left side portion of the clamp bracket 24, is attached to the leftmost side of a transom of a ship 122, an outboard motor 82, in which the electric propulsor 32 is attached to the right side portion of the clamp bracket 24, is attached to the rightmost side of the transom of the ship 122, and an internal-combustion-driven outboard motor which is not a hybrid outboard motor is attached to a center in the left-right direction of the transom of the ship 122. Therefore, the two hybrid outboard motors 81 and 82 and an internal-combustion-driven outboard motor 83 which is not a hybrid outboard motor can be multi-mounted. In addition, only the two hybrid outboard motors 81 and 82 may be attached to the transom of the ship 122.

Figure 10B:
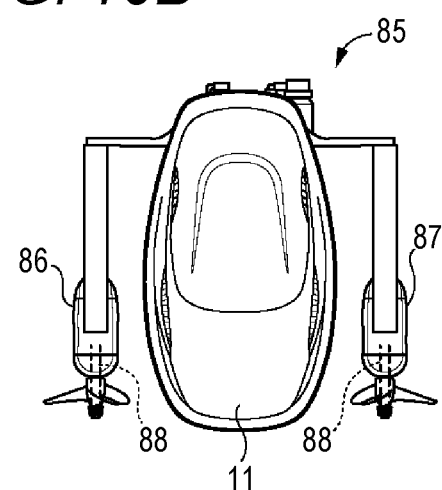

In addition, in the embodiment described above, the two electric propulsors 31 and 32 are disposed such that the propeller shafts 35 of the two electric propulsors 31 and 32 form an inverted V shape when the outboard motor 1 is viewed from above. However, the present invention is not limited thereto. As in a hybrid outboard motor 85 shown in FIG. 10B, two electric propulsors 86 and 87 may be disposed such that propeller shafts 88 of the two electric propulsors 86 and 87 are parallel to each other when the outboard motor 85 is viewed from above.

Figure 10C:
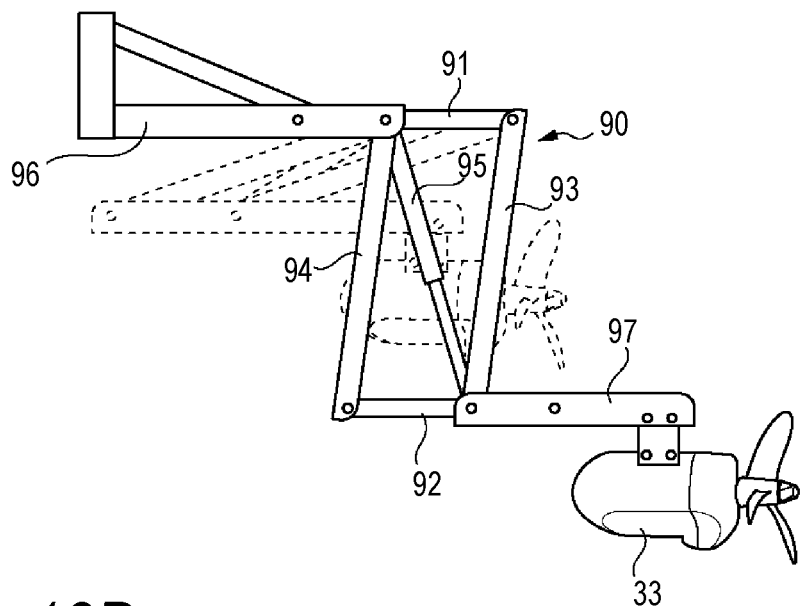

In addition, in the present invention, an elevating device 90 shown in FIG. 10C can be adopted. Four link members 91 to 94 of the elevating device 90 form a parallel crank mechanism similarly to the link members 41 to 44 of the elevating device 40 in the above embodiment. Specifically, the first link member 91 extends substantially in the front-rear direction, and the second link member 92 extends parallel to the first link member 91. An upper end side of the third link member 93 is rotatably joined to a rear end side of the first link member 91, and a lower end side of the third link member 93 is rotatably joined to a rear end side of the second link member 92. The fourth link member 94 extends parallel to the third link member 93. In addition, an upper end side of the fourth link member 94 is rotatably joined to a front end side of the first link member 91, and a lower end side of the fourth link member 94 is rotatably joined to a front end side of the second link member 92. In addition, a front end portion of an actuator 95 is rotatably joined to the front end side of the first link member 91, and a rear end portion of the actuator 95 is rotatably joined to the lower end side of the third link member 93. In addition, the first link member 91 is fixed to the attachment bracket 55 via a support member 96. In addition, the electric propulsion part 33 is fixed to the second link member 92 via a support member 97. A mechanism other than the parallel crank mechanism may be used as the elevating device of the present invention.

Figure 10D:
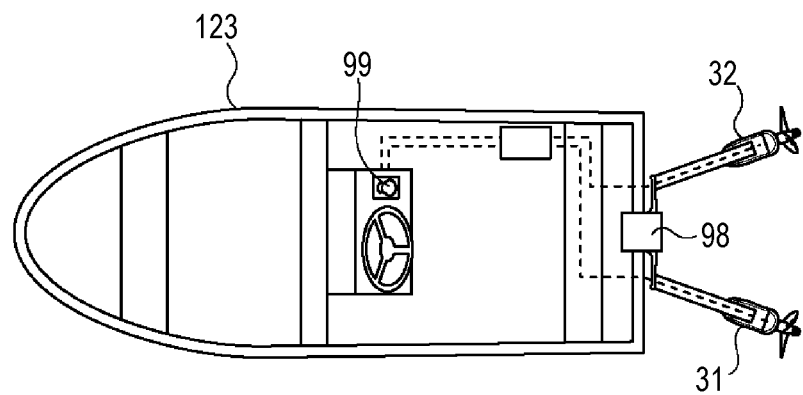

In addition, as shown in FIG. 10D, only the two electric propulsors 31 and 32 may be attached to a transom of a ship 123 via a fixing bracket 98 as means for applying a propulsive force to the ship 123. In this case, a joystick type remote controller 99 may be provided in the ship 123, and the elevating device 40 of each of the electric propulsors 31 and 32 and the electric motor 34 of the electric propulsion part 33 may be operated by the remote controller 99.

In addition, in FIG. 8, the connection between the controller 71 and the inverter 37 of the electric propulsion part 33 of each of the electric propulsors 31 and 32 may be wired or wireless.

In addition, the present invention is not limited to the outboard motor, and may be applied to an inboard-outboard motor. When the present invention is applied to an inboard-outboard motor, for example, the electric propulsors 31 and 32 are attached to a fixing bracket that fixes an internal-combustion-driven propulsion device in the inboard-outboard motor to a ship.

In addition, the present invention can be modified as appropriate without departing from the scope or spirit of the invention which can be read from the claims and the entire specification, and the hybrid ship propulsion machine to which such a change is applied is also included in the technical concept of the present invention.

What is claimed is:

1. A hybrid ship propulsion machine comprising:
   an internal-combustion-drive propulsion part configured to generate a propulsive force of a ship by an internal combustion engine;
   a fixing bracket configured to fix the internal-combustion-drive propulsion part to the ship;
   an electric propulsion part configured to generate a propulsive force of the ship by an electric motor;
   an elevating device configured to elevate and lower the electric propulsion part; and
   an attachment bracket attaching the electric propulsion part and the elevating device to the fixing bracket, wherein
   the internal-combustion-drive propulsion part includes
      the internal combustion engine;
      a first propeller shaft configured to be rotated by power output from the internal combustion engine;
      a power transmission mechanism configured to transmit the power output from the internal combustion engine to the first propeller shaft;
      a first housing part housing the internal combustion engine, the first propeller shaft, and the power transmission mechanism; and
      a first propeller attached to the first propeller shaft,
   the electric propulsion part includes
      the electric motor;
      a second propeller shaft configured to be rotated by power output from the electric motor;
      a second housing part housing the electric motor and the second propeller shaft; and
      a second propeller attached to the second propeller shaft, and
   the elevating device is configured to elevate and lower the electric propulsion part between a position where the second propeller sinks below a water surface and a position where the second propeller comes out of the water surface.

2. The hybrid ship propulsion machine according to claim 1, wherein
   the elevating device is configured to elevate and lower the electric propulsion part while maintaining a state in which the second propeller shaft extends horizontally.

3. The hybrid ship propulsion machine according to claim 2, wherein
   the elevating device includes:
   a first link member extending in one direction and fixed to the attachment bracket;
   a second link member extending parallel to the first link member and to which the electric propulsion part is fixed;
   a third link member having one end side that is rotatably joined to one end side of the first link member and the other end side that is rotatably joined to one end side of the second link member;
   a fourth link member extending parallel to the third link member, and having one end side that is rotatably joined to the other end side of the first link member and the other end side that is rotatably joined to the other end side of the second link member; and
   an actuator configured to rotate the third link member and the fourth link member with respect to the first link member.

4. The hybrid ship propulsion machine according to claim 1, further comprising:
an elevating controller configured to, when the ship reaches a planing state, control the elevating device to automatically elevate the electric propulsion part such that the second propeller comes out of the water surface.

5. The hybrid ship propulsion machine according to claim 1, wherein
an inverter configured to control driving of the electric motor is provided in the second housing part.

6. The hybrid ship propulsion machine according to claim 1, further comprising:
two electric propulsors each including the electric propulsion part, the elevating device, and the attachment bracket, wherein
when the hybrid ship propulsion machine is viewed from above, the two electric propulsors are disposed such that the second propeller shaft of each of the two electric propulsors is parallel to each other or form an inverted V shape.

7. The hybrid ship propulsion machine according to claim 1, wherein
the attachment bracket is provided with an attachment part configured to attach the electric propulsor including the electric propulsion part, the elevating device, and the attachment bracket to the fixing bracket, and
the electric propulsor is detachably attached to the fixing bracket via the attachment part.

8. The hybrid ship propulsion machine according to claim 7, wherein
the fixing bracket or the attachment part has an attachment position changing structure configured to capable of changing an attachment position of the electric propulsor with respect to the fixing bracket in an upper-lower direction.

* * * * *